United States Patent [19]

Haeufler et al.

[11] 4,097,298

[45] Jun. 27, 1978

[54] COATING COMPOSITION HAVING A WATER-DILUTABLE MALEINIZED OIL BASE

[75] Inventors: Hartmut Haeufler, Aldingen; Gerhard Günther, Ettlingen, both of Germany

[73] Assignee: AKZO N.V., Arnheim, Netherlands

[21] Appl. No.: 650,351

[22] Filed: Jan. 19, 1976

[30] Foreign Application Priority Data

Jan. 22, 1975  Netherlands ................. 7500737

[51] Int. Cl.² ................................ C08L 91/00
[52] U.S. Cl. ...................... 106/243; 106/252
[58] Field of Search .................. 106/243, 252; 260/485 H, 410.6

[56] References Cited

U.S. PATENT DOCUMENTS

| | | | |
|---|---|---|---|
| 2,426,902 | 9/1947 | Seymour | 260/485 H |
| 2,427,255 | 9/1947 | Burrell | 106/243 |

*Primary Examiner*—Theodore Morris
*Attorney, Agent, or Firm*—Stevens, Davis, Miller & Mosher

[57] ABSTRACT

A water-dilutable maleinized oil base coating composition is prepared by mixing from about 10 to about 90% by weight water-dilutable maleinized oil with from about 90% to about 10% by weight of a solid particulate polyester which contains from 5 to 35% by weight of a halogen. One of the carboxylic acids used in making the solid particulate polyester contains a halogen. The percentages by weight of the coating composition are based on the total weight of the two components on a solvent free basis. The novel coating composition can be used to advantage for coating any substrate and particularly for coating automobile bodies.

11 Claims, No Drawings

COATING COMPOSITION HAVING A WATER-DILUTABLE MALEINIZED OIL BASE

This invention relates generally to coating compositions and more particularly to a water-dilutable maleinized oil based composition.

A water-dilutable maleinized oil of the type contemplated herein is a water-soluble product obtained by the addition of an α-β-ethylenically unsaturated dicarboxylic acid to an ethylenically unsaturated monocarboxylic acid containing 6 to 24 carbon atoms or an ester of such a monocarboxylic acid and an alcohol containing 2 to 6 hydroxyl groups.

The alcohol may be, for example, a trivalent or tetravalent alcohol such as glycerol, trimethylol propane, pentaerythritol or the like. Other hydroxyl compounds may be used instead of or with the alcohol such as, for example, low-molecular reaction products of epichlorohydrin with bisphenol-A or copolymers of styrene and allyl alcohol.

The ethylenically unsaturated dicarboxylic acid may be maleic acid, fumaric acid or the like such as the anhydride thereof.

Any suitable ethylenically unsaturated monocarboxylic acid which contains one or more carbon to carbon double bonds may be used, such as, for example, the fatty acids, oleic acid, ricinoleic acid, linoleic acid, linolenic acid, sorbic acid, eleostearic acid and licanic acid, or mixtures thereof.

Any suitable ester of an ethylenically unsaturated monocarboxylic acid and a polyhydric alcohol may be used such as, for example, natural oils, such as linseed oil, soya bean oil, sunflower oil, safflower oil, rape seed oil, cotton seed oil, wood oil, fish oil or castor oil, or synthetic oils prepared from a fatty acid and a polyhydric alcohol such as trimethylol propane or pentaerythritol. The ethylenically unsaturated monocarboxylic acid or the polyolester thereof preferably has an iodine value between 80 and 370, and most preferably within the range of from 130 to 200.

Still other compounds may be chemically bonded in the maleinized oil, such as, for instance: monocarboxylic acids, such as palmitic acid, benzoic acid, p-tert-butyl benzoic acid, dicarboxylic acids, the compounds such as colophony or dimerized, oxidized or hydrogenated colophony. Moreover, the oil may be modified with, for instance, styrene, vinyl toluene or cyclopentadiene.

Generally, the maleinized oil contains 10 to 40 percent by weight, and preferably 18 to 25 percent by weight of the α,β-ethylenically unsaturated dicarboxylic acid and the oil has an acid number in the range of 115 to 475, and preferably of 210 to 290.

To render the maleinized oil miscible with water or, in other words, dilutable with water, the oil is entirely or partially neutralized in a known manner with an alkaline compound. Suitable alkaline compounds are inorganic hydroxides, such as ammonia or lithium hydroxide, or primary, secondary or tertiary amines, for instance, monoethylamine, monobutylamine, dimethylamine, diethylamine, triethylamine, diethanolamine or triethanolamine.

The maleinized oil may be prepared in a known manner, for instance by the reaction of an α,β-ethylenically unsaturated dicarboxylic acid with the ethylenically unsaturated monocarboxylic acid or the polyolester thereof, at a temperature generally within the range of from 150° to 260° C, in the presence, if desired, of a catalyst.

The water-dilutable maleinized oils may be used as a film-forming constituent in coating compositions such as varnishes and paints. Such coating compositions, however, have a number of disadvantages. For example, at a solids content of more than 35% with only water being used as a solvent for the maleinized oil, the viscosity is very high. Consequently, in order that these systems may be satisfactorily worked, they must be thinned to such a degree that the solids content becomes too low, so that a sufficiently thick coating can be obtained only by repeatedly applying the coating composition to the substrate in layers one on the other. Such a procedure, however, is very uneconomical. Attempts have been made to somewhat remedy this drawback by adding an organic solvent to the coating composition. As a result, however, the compositions both when they are being used and during drying are objectionable from a point of view of safety and environmental hygiene.

An object of the invention is to provide a coating composition which is suitable for industrial use, and more particularly for application in the automobile industry, for instance as a coating of motor car bodies, and does not show the above mentioned drawbacks. The coating composition is of relative low viscosity even at high solids content, dries quickly and does not pollute the air with organic solvents since such solvents are not required. Moreover, the coating composition is easy to apply making it possible to obtain smooth surfaces without irregularities. Another advantage is that the dried coating composition can still be washed off with water even after a few days time.

The foregoing objects and others are accomplished in accordance with this invention, generally speaking, by providing a coating composition which contains a binder made up of 10-90% by weight of a water-dilutable maleinized oil and 90-10% by weight of a solid particulate polyester which contains a halogen-containing polycarboxylic acid in such an amount that the polyester contains 5 to 35% by weight of chlorine or the corresponding amount of a different halogen, the two first-mentioned percentages by weight being calculated on the sum of the two solvent-free compounds. It is preferred that the binder should be made up of 30-70% by weight of the maleinized oil and 70-30% by weight of the solid particulate polyester, the percentages by weight being based on the sum of the two solvent-free components.

The solid particulate polyester is generally the reaction product of one or more aliphatic and/or cycloaliphatic mono-, di- and/or polyvalent alcohols, for instance: ethylene glycol; propylene glycol; neopentyl glycol; benzyl alcohol; glycerol, trimethylol ethane; trimethylol propane; perhydrobisphenol; 1,1'-isopropylidene - bis (p-phenyleneoxy)-di-ethanol-2; 1,1'-isopropylidene-bis (p-phenyleneoxy)-di-propanol-2; dicyclohexanol-2,2-propane or pentaerythritol with one or more aliphatic, cycloaliphatic and/or aromatic mono-, di- and/or polyvalent carboxylic acids, for example, isononanoic acid, pelargonic acid, so-called pre-condensed fatty acid having 5 to 10 carbon atoms, stearic acid, oleic acid, cerotic acid, linolenic acid, benzoic acid, tert-butyl benzoic acid, maleic acid, fumaric acid, phthalic acid, isophthalic acid, terephthalic acid, tetrahydrophthalic acid, trimellitic acid, endomethylene tetrahydrophthalic acid or the like.

The ratio between the alcohol component and the carboxylic acid component in the solid particulate polyester may as a rule vary between fairly wide limits. A suitable ratio between the carboxylic acid and the alcohol is for instance 1 carboxyl equivalent to 1-4 hydroxyl equivalents, and preferably 1 carboxyl equivalent to 1.1-1.5 hydroxyl equivalents. Although in the preparation of the solid polyester it is not necessary to use a monocarboxylic acid, it is often used in a ratio of 2-10 moles of monocarboxylic acid to 8-12 equivalents of polycarboxylic acid. Also, the alcohol component of the polyester may generally be chosen arbitrarily, but it is preferred that use should be made of an alcohol mixture which is made up of 1-1.5 moles of a divalent alcohol and 4-5 moles of a tri- or polyvalent alcohol.

According to the invention the solid particulate polyester also contains a halogen-containing polycarboxylic acid bound in the ester chain. It is preferred that this should be a cyclic chlorine and/or bromine-containing carboxylic acid, for instance dichlorophthalic acid, tetrachlorophthalic acid or hexachloroendomethylene tetrahydrophthalic acid (HET-acid) or the corresponding bromine compounds. The polyester generally contains the halogen-containing carboxylic acid in such an amount that the polyester contains 5 to 35% by weight of chlorine and preferably 12 to 19% by weight of chlorine or the corresponding amount of a different halogen.

The solid particulate polyester has a melting point which is generally within the range of from about 20° C and its baking temperature, which is generally about 150°-180° C; its melting point is preferably within the range of from 50° to 130° C. The acid number of the solid particulate polyester is generally below about 10, and preferably below about 2. The hydroxyl number may vary between wide limits, for instance, between 0 and 200, and preferably between 80 and 130. The mean particle size of the solid polyester is generally smaller than about 500 μm, and preferably within the range of from 0.1 to 100 μm.

The solid particulate polyester may be prepared in any suitable manner, for instance by the so-called melt-process, in which the components react with each other with evaporation of the water liberated, or by the so-called solvent process, in which the water is removed azeotropically using, for instance, toluene, xylene or the like as a solvent.

The water-dilutable maleinized oil and the solid particulate polyester may be combined in a simple manner, for instance by intermixing the solid polyester and the maleinized oil and subsequently pulverizing the mixture. Alternatively, however, the solid polyester may be ground in the absence of the oil and be mixed subsequently with the oil. One advantage is that with either method of mixing no surface active compounds or protective colloids need be added.

The coating composition may contain the usual additives, for example, pigments, fillers and levelling agents. The coating composition may also contain one or more of the customary curing agents, for example condensation resins of an aldehyde such as formaldehyde with a nitrogen containing compound such as melamine, urea, dicyandiamide or benzoquanine. Preferably, the above-mentioned compounds are partially or entirely etherified with an alcohol containing 1 to 6 carbon atoms, such as methanol, ethanol, propanol, butanol, amyl alcohol or hexanol. More preferably, a methylol melamine containing from 4 to 6 methylol groups per molecule of melamine is used, at least three of the methylol groups being etherified with methanol, ethanol, propanol or butanol.

The coating composition may be applied to a substrate in any desirable way, such as by roller-coating, spraying, brushing, sprinkling, casting, dipping or electrostatic spraying. After the coating composition has been applied to a substrate, it is baked and cross-linked at temperatures which are above the melting point of the solid polyester. The temperatures used are within the range of from 80° to 200° C, and preferably between 130° and 170° C.

The properties of the baked coating composition are at least as good as those of the usual baking varnishes.

EXAMPLES A - H

Eight solid polyesters were prepared by polycondensation of the compounds mentioned in Table 1 for each polyester in amounts also listed in this table. The preparation was carried out in a reactor fitted with a stirrer, a thermometer, a water outlet, a condenser and an inlet tube for an inert gas such as nitrogen or helium. All starting materials were charged into the reactor in the order indicated, followed by adding 7% by weight of xylene. The reaction mixture was melted and heated to boiling temperature (185°-190° C) with stirring and under a stream of inert gas. The water formed during polycondensation was removed azeotropically by the xylene, the xylene being fed back into the reactor. During polycondensation, which lasted 10-15 hours, the reaction process was followed by determining the acid number. The reaction was allowed to proceed until an acid number of 2-3 had been reached, after which the xylene was removed under vacuum. Finally, the solid polyester prepared was ground to a powder having an average particle size of less than 200 μm.

| Compounds | A | B | C | D | E | F | G | H |
|---|---|---|---|---|---|---|---|---|
| | \multicolumn{8}{c}{Amounts in moles} | | | | | | | |
| pre-condensed fatty acid | | | | | | | 2 | |
| isononanoic acid | 2 | 2 | 2.5 | 2.5 | | 2 | | |
| pelargonic acid | | | | | 2 | | | 2 |
| benzoic acid | 2 | 7 | | | | | | |
| tert.butyl benzoic acid | | | 2.5 | 2.5 | | | | |
| isophthalic acid | 2 | 2 | 4 | 3 | | | | 2 |
| phthalic anhydride | | | | | | 2 | 2 | |
| maleic anhydride | | | | | 3 | 1 | 1 | 1 |
| tetrachlorophthalic anhydride | | | | | | | 1 | 2 |
| HEt-acid | 2 | 2 | 1 | 2 | 2 | 2 | 1 | |
| trimethylol ethane | | | | | | | | 5 |
| trimethylol propane | 5 | | 6 | 6 | 3 | 5 | 5 | |
| perhydrobisphenol | | | | | 3 | | | |
| 1,1'-isopropylidene-bis (p-phenylene-oxy)-di- | | | | | | | | |

-continued

| Compounds | Examples | | | | | | | |
|---|---|---|---|---|---|---|---|---|
| | A | B | C | D | E | F | G | H |
| | Amounts in moles | | | | | | | |
| ethanol-2 | | | | | | | | 1 |
| 1,1'-isopropylidene-bis (p-phenylene-oxy)-dipropanol-2 | | | | | 1 | | | |
| dicyclohexanol-2,2-propane | | | | | | | 1 | |
| pentaerythritol | | 5 | | | | | | |
| ratio carboxyl:hydroxyl in the polyester | 1:1.25 | 1:1.18 | 1:1.2 | 1:1.2 | 1:1.25 | 1:1.42 | 1:1.42 | 1:1.42 |
| %-by weight halogen in the polyester | 20.0 | 16.1 | 8.8 | 16.1 | 18.1 | 18.1 | 16.4 | 13.2 |
| melting point of the polyester (° C) | 80-85 | 94-98 | 70-75 | 77-80 | 68-72 | 58-62 | 80-94 | 75-80 |

EXAMPLES K - Y

The respective compounds given in the amounts (in moles) listed in Table 2 were esterified to form the synthetic oils to be used for the preparation of the maleinized oils. The esterification was carried out in a reactor in accordance with Examples A-H. All starting materials were charged into the reactor in the order indicated, followed by adding 4% by weight of xylene. The reaction mixture was melted in the presence of an esterification catalyst (tinoctoate) and heated to boiling temperature (230°-240° C), with stirring and under a stream of inert gas. The water formed during the esterification was removed azeotropically by the xylene, and xylene being fed back into the reactor. During the esterification, which may last up to 24 hours, the reaction process was followed while determining the acid number. The reaction was allowed to proceed until the acid number had reached a value below 10 and no longer changed upon continued heating of the reaction mixture to 230°-240° C. Subsequently, the xylene was removed by vacuum.

The resulting synthetic oils or natural oils were then reacted with maleic anhydride in the amounts (parts by weight) given in Table 2. The reaction was carried out in a reactor equipped with a stirrer, a thermometer and a reflux condenser. The starting materials were brought into the reactor in the order indicated, after which the reaction mixture was kept at a temperature of 195°-220° C. After about 3 hours the reaction mixture no longer contained any free maleic anhydride and the reaction was completed. The maleinized oil was cooled to a temperature below 95° C and subsequently mixed with water and triethylamine in amounts such that an aqueous solution with a solids content of 40% and a pH of 7.5 was obtained.

Table 2

| Compounds | Examples | | | | | | | | | | | | | | |
|---|---|---|---|---|---|---|---|---|---|---|---|---|---|---|---|
| | K | L | M | N | O | P | Q | R | S | T | U | V | W | X | Y |
| | parts by weight | | | | | | | | | | | | | | |
| Maleic anhydride | 19 | 25 | 28 | 16 | 30 | 24 | 25 | 20 | 17 | 22 | 19 | 18 | 23 | 18 | 25 |
| Natural oils: | | | | | | | | | | | | | | | |
| Linseed oil | 81 | | | | | | | | | | | | | | |
| Soya bean oil | | 75 | | | | | | | | | | | | | |
| Wood oil | | | 72 | | | | | | | | | | | | |
| Safflower oil | | | | 84 | | | | | | | | | | | |
| Synthetic oils prepared from: | | | | | 70 | 76 | 75 | 80 | 83 | 78 | 81 | 82 | 77 | 82 | 75 |
| | Amounts in moles | | | | | | | | | | | | | | |
| Linseed fatty acid | 4 | 2 | | | 2 | | | 2 | | 1 | 1 | | | | 3 |
| Tall fatty acid | | 1 | | | | 3 | | | 1 | | | 2 | | | |
| Safflower fatty acid | | | 2 | | | | | | | | | 2 | 2 | | |
| Castor fatty acid | | | | | | | | | 1 | | | | 2 | | |
| Oleic acid | | | 1 | | | | 1 | | | | 1 | | | | |
| Isononanoic acid | | | | | | | | | 1 | | | | | | |
| Benzoic acid | | | | | | | 1 | | | | | | | 1 | |
| Colophony | | | | | | | | | | | | | | | 1 |
| Pentaerythritol | 1 | | | | | | 1 | | | 1 | 1 | | | | 1 |
| Glycerol | | | | | | 1 | | | | | | | 1 | | |
| Trimethylol propane | | 1 | 1 | | | | | | 1 | | | | | | |
| Neopentyl glycol | | | | 1 | | | | | | | | | | | |

EXAMPLES 1 - 15

49 parts by weight of each of the solutions of the maleinized oils with a solids content of 40% obtained in accordance with the Examples K-Y were mixed with 11 parts by weight of a solid particulate polyester prepared in conformity with Example F and with 1 part by weight of a water-soluble melamine resin (Cymel 300). To this mixture there were subsequently added 41 parts by weight of a pigment mixture of zinc sulphide (60% by weight) and barium sulphate (40% by weight), after which the mixture was ground to a particle size of 25 μm. Finally, by the addition of dimethylethanolamine the pH of the coating composition was brought to a value of 8.2 and by the addition of 5-7% by weight of water the viscosity was decreased to 18 seconds (measured in conformity with DIN 53211).

The resulting coating composition was applied as crosscoats to flat sheet metal to a thickness of 25-200 μm and baked for 30 minutes at 170° C. The baked coatings showed indentation values of 1.5-7.3 (measured in accordance with DIN 53156), hardness values of 50-110 (measured in accordance with DIN 53157), gloss values of 30-50% (measured in accordance with Gardner 60°), and bending values of 1-12 mm (measured in conformity with ASTM D52260). The coatings obtained show good to very good rubbing properties both in the wet and in the dry state.

EXAMPLES 16 – 23

A solution with a solids content of 40% of a maleinized oil was mixed with a solid particulate polyester obtained according to one of the Examples A-H, the amounts (in percentages by weight) and the compositions of the components being given in Table 3. The composition of each component is designated by the letter of the Example in which the component was prepared. To this mixture were added 1 part by weight of a water-soluble melamine resin (Cymel 300) and the number of parts by weight of water and pigment mixture of zinc sulphide (60% by weight) and barium sulphate (40% by weight) given in Table 3.

Subsequently, the mixture was ground to a particle size of less than 200 μm. Finally, dimethylethanolamine was added to bring the pH of the coating composition to a value of 7.8.

The coating composition was tested in exactly the same way as in the preceding examples. The indentation values, hardness values, gloss values and bending values were found to be 0.5–8.5, 30–120, 30–50%, and 1–16 mm, respectively. The coatings obtained show good to very good rubbing properties both in the wet and in the dry state.

Table 3

| Compounds | Examples | | | | | | | |
|---|---|---|---|---|---|---|---|---|
| | 16 | 17 | 18 | 19 | 20 | 21 | 22 | 23 |
| Maleinized oil | S-75 | U-100 | K-125 | L-150 | T-168 | Y-175 | P-188 | Q-200 |
| Polyester powder | G-70 | H-60 | E-50 | C-40 | F-33 | A-30 | B-25 | D-20 |
| Water | 20 | 10 | 10 | 5 | 3 | 2 | 2 | 2 |
| Pigment mixture | 70 | 80 | 80 | 100 | 120 | 120 | 150 | 150 |

Although the invention is described in detail for the purpose of illustration it is to be understood that such detail is solely for that purpose and that variations can be made therein by those skilled in the art without departing from the spirit and scope of the invention except as it may be limited by the claims.

What is claimed is:

1. A water-dilutable maleinized oil based coating composition containing a binder made up of 10–90% by weight of the water-dilutable maleinized oil and 90–10% by weight of a solid particulate polyester which contains halogen-containing polycarboxylic acid in an amount whereby the solid particulate polyester contains a halogen in an amount equivalent to 5 to 35% by weight of chlorine, the percentages by weight of the two components being calculated on the sum of the solvent-free weights thereof, said maleinized oil containing from 10–40% by weight of residues from an α-β-ethylenically unsaturated dicarboxylic acid.

2. The coating composition of claim 1, wherein the binder is made up of 30–70% by weight of the maleinized oil and 70–30% by weight of the solid particulate polyester, the percentages by weight being based on the sum of the solvent-free weights of two components.

3. The coating composition of claim 1 wherein the ratio of the alcohol component to the carboxylic acid component in the solid particulate polyester is 1 carboxyl equivalent to 1 to 4 hydroxyl equivalents.

4. The coating composition of claim 1 wherein the solid particulate polyester contains a monocarboxylic acid in a ratio of 2–10 moles of monocarboxylic acid to 8–12 equivalents of polycarboxylic acid.

5. The coating composition of claim 1 wherein the solid particulate polyester contains a cyclic chlorine or bromine-containing carboxylic acid.

6. The coating composition of claim 1 wherein the solid particulate polyester contains 12 to 19% by weight of a halogen.

7. The coating composition of claim 1 wherein the average particle size of the solid particulate polyester is smaller than about 500 μm.

8. The coating composition of claim 1 wherein the solid particulate polyester has a melting point within the range of from 20°–180°.

9. A process for coating a substrate which comprises applying the composition of claim 1 on the substrate and baking the resulting coating.

10. The method for reducing the viscosity of a water-miscible malenized oil coating composition without reducing its solids content which comprises mixing with the malenized oil a solid particulate polyester prepared from components including a polycarboxylic acid which contains a halogen in an amount whereby the polyester contains 5 to 35% by weight halogen.

11. A coating composition containing a water-miscible malenized oil and a solid particulate polyester which contains 5–35% halogen.

* * * * *